Jan. 11, 1927. 1,614,062
R. ENGLER
DRIVING GEAR FOR PAPER SIEVE STRETCHING MACHINES
Filed August 29, 1921   4 Sheets-Sheet 3

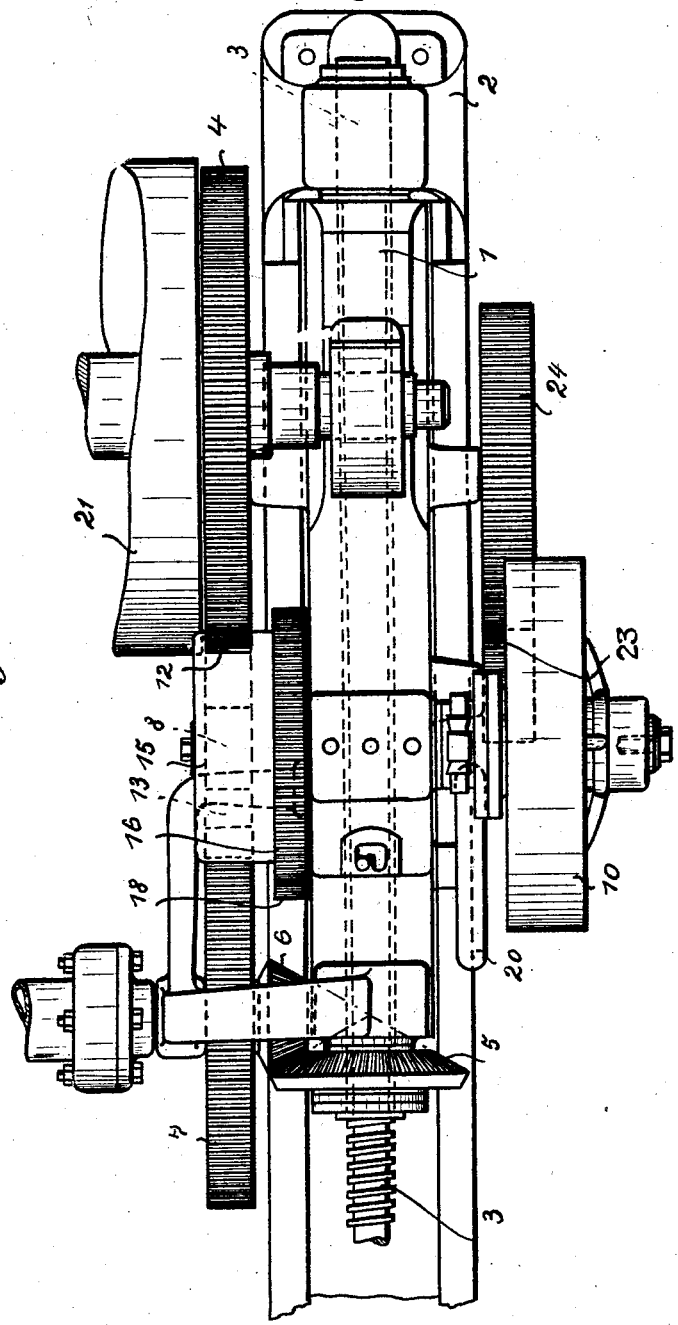

Patented Jan. 11, 1927.

1,614,062

UNITED STATES PATENT OFFICE.

RUDOLF ENGLER, OF SAALFELD, GERMANY.

DRIVING GEAR FOR PAPER-SIEVE-STRETCHING MACHINES.

Application filed August 29, 1921, Serial No. 496,798, and in Germany June 6, 1919.

This invention relates to improvements in machines for stretching wire gauze to be used in paper making machines and having the form of an endless wire gauze. In these machines the wire gauze is conducted over a roll which is stationary during the working period and over a second roll the bearing of which is movable perpendicularly to its axis of rotation. The adjusting of this roll, which is called the stretching roll, is effected by means of a threaded shaft.

The machine must be constructed in such a manner that the stretching roll can be rotated with simultaneous displacement of its bearing and without such displacement, in the latter case in opposite direction. The threaded shaft which controls the shifting of the stretching roll must further be adapted to be rotated for itself in opposite direction.

All these movements are produced according to the invention by a gear acting on the stretching roll and on the threaded shaft at the same time, this gear being adapted by the simple adjusting of one element to the different movements to be communicated to the roll and to the threaded shaft.

The gear acting upon the stretching roll and upon the threaded shaft designed to shift this stretching roll comprises a carrier the movement of which is transmitted by intermediate elements to two other elements of which the one is rigidly or positively connected with the stretching roll and the other with the threaded shaft, said intermediate elements being arranged so that they can be simultaneously displaced in such a manner that every adjustment of the intermediate elements is transmitted to the driving gear of the stretching roll as well as to the driving gear of the threaded shaft.

In the accompanying drawings:

Fig. 7 is a plan view more or less complete of the structure of Fig. 1.

Figure 1:
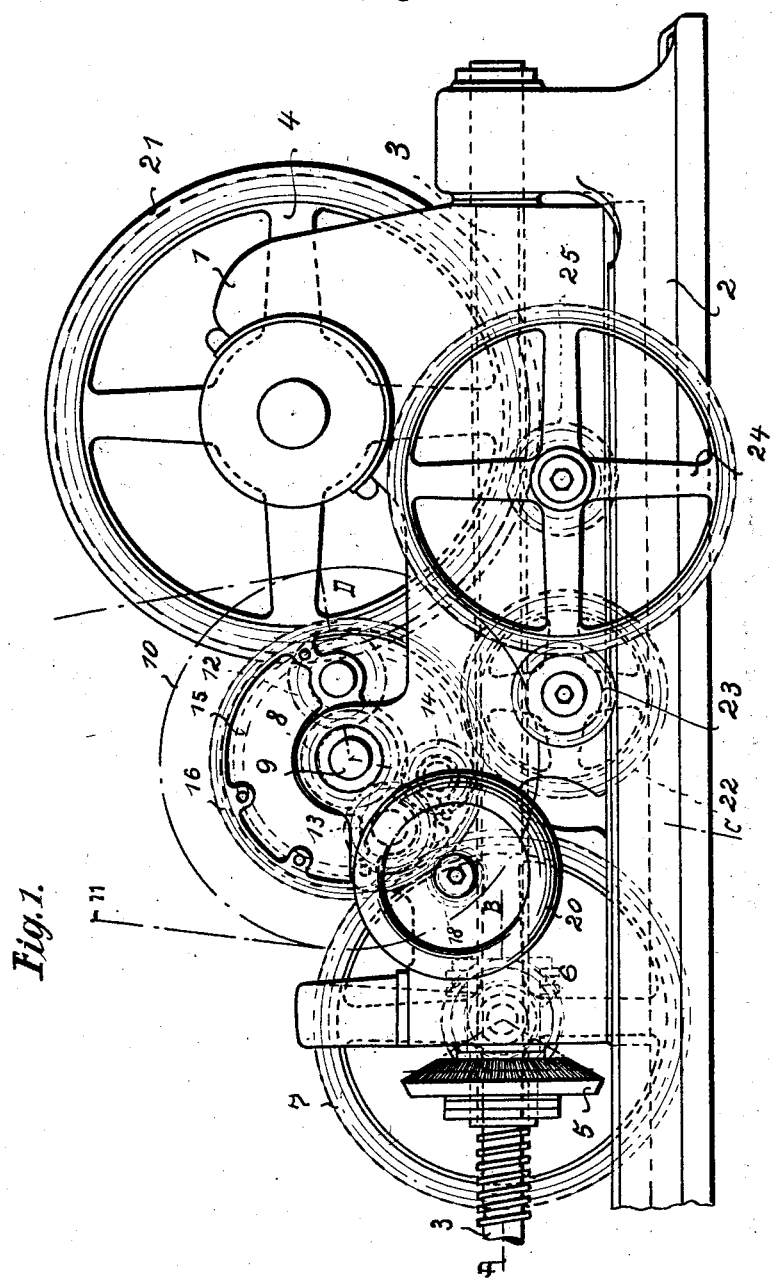
Fig. 1 shows in side view the stretching machine and its driving gear.

The bracket 1, in which the stretching roll 21 is mounted, is adapted to be moved on a guide path of the machine frame 2 perpendicularly to the axis of rotation of the roll. The shifting of the bracket 1 is controlled by a screw spindle 3. The stretching roll 21 is driven by the gear wheel 4 rigidly connected with the same, said gear wheel 4 being driven from the gear wheel 8. On the shaft 9 of gear wheel 8 a belt pulley 10 is mounted which is connected with a friction clutch. The shaft 9 participates in the shifting of the bracket 1 and the belt 11 of pulley 10 is connected with the tension pulley designed to compensate the shifting.

Figure 2:
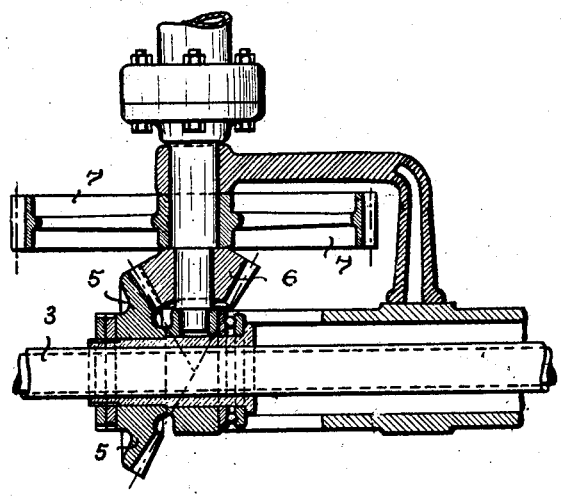
Fig. 2 is a section on line A—B of Fig. 1.
Figure 3:
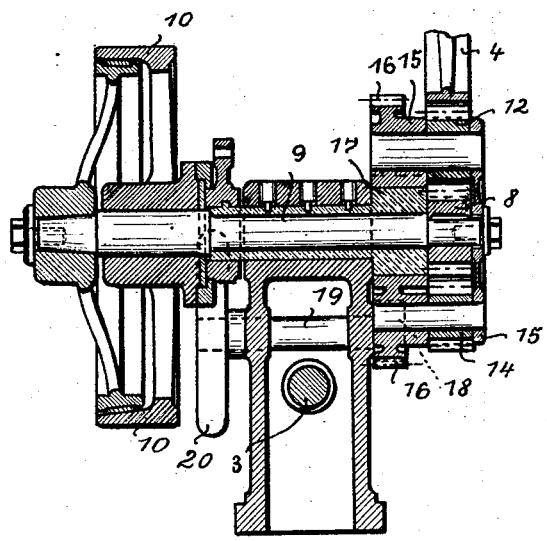
Fig. 3 is a section on line C—D of Fig. 1.

The gear wheel 8 serves also for driving the screw spindle 3 through the intermediary of the gear wheel 7, on the shaft of which a bevel wheel 6 (Figs. 2 and 7) is keyed. The bevel wheel 6 meshes with the bevel wheel 5 mounted on the screw spindle 3. The gear wheel 8 is permanently in gear with the gear wheels 12, 13. The gear 13 is permanently in gear with a gear wheel 14. The gears 12, 13, 14 are mounted in a carrier 15 rotatably mounted on a bush 17 concentrically mounted on shaft 9. The carrier 15 has a toothed rim 16 gearing with a gear wheel 18 on the shaft 19 of which a hand wheel 20 is keyed. By rotation of the hand wheel 20 the carrier 15 with the gears 12, 13 and 14 can therefore be rotated around the axis of shaft 9 of the gear wheel 8.

Figure 4:
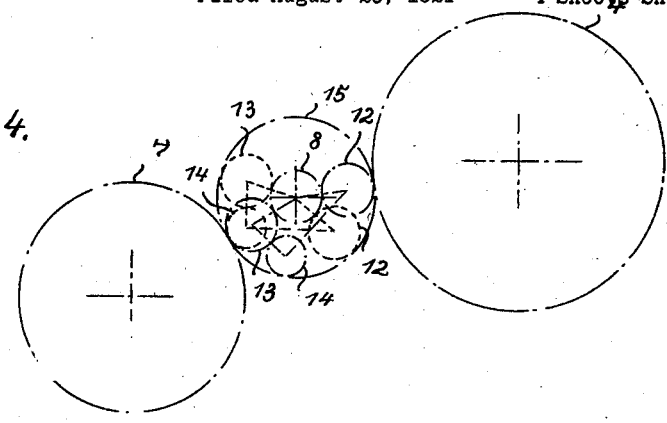
Figs. 4, 5 and 6 are diagrams illustrating the different positions of the driving gear.
Figure 5:
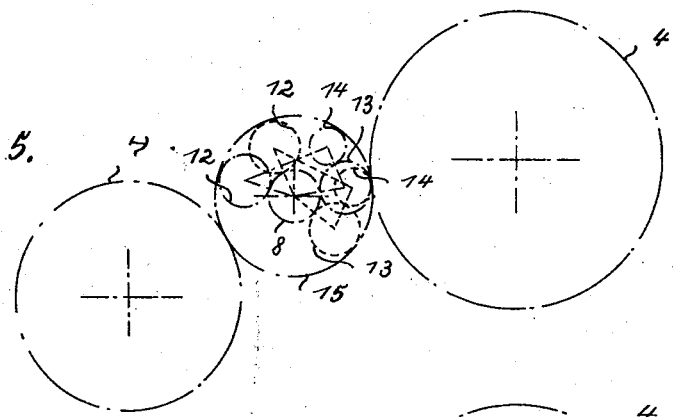
Figure 6:
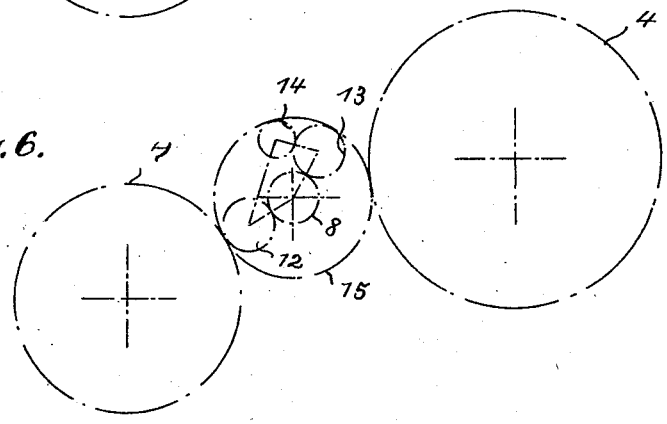

By corresponding adjustment of the carrier 15 by means of the hand wheel 20 the rotation of shaft 9 is transmitted in different manners to the gear wheels 4 and 7 or to one of the same alone as shown in the diagrams Figs. 4, 5, 6.

In the position of the carrier 15, shown in dot and dash lines in Fig. 4, this position being identical with that shown in Fig. 1, the gear 12 is in gear with the gear wheel 4, the gear 13 being in gear with a gear wheel 7 so that the gear wheels 4 and 7 are both driven in such directions that the stretching roll 21 and the threaded shaft 3 execute the rotations required for stretching the wire gauze. If the carrier 15 is brought to the position indicated in Fig. 4 in dotted lines the gears 12 and 13 get out of gear with the wheels 4 and 7, the gear 14, which rotates in opposite direction to wheel 13, coming in gear with wheel 7 so that the threaded shaft 3 is rotated in backward direction, the roll 21 connected with wheel 4 being stopped.

If the carrier adopts the position shown in Fig. 5 in dot and dash lines the gear 13 is in gear with wheel 4, the gear 7 being not driven by any of the gears 12 and 14. The stretching roll 21 is therefore rotated alone in a direction opposite to the stretching rotation, the threaded shaft 3 being at rest. By bringing the carrier 15 into the position indicated in Fig. 5 in dotted lines gear 14 comes in gear with wheel 4 so that only this wheel and the stretching roll connected with the same are rotated backward.

If the gear carrier 15 is adjusted to the position Fig. 6 only the threaded shaft 3 is rotated by the gear 12 gearing with wheel 7 in the direction for stretching.

By means of the back gear 22, 23, 20, 24, 25 shown in Fig. 1 the stretching roll may be rotated with slower speed than when it is directly driven by wheel 4. With this object in view the gear 14 is brought in gear with the wheel 22 which is rigidly connected with the wheel 23. The wheel 24 gears with wheel 23 and is rigidly connected with the wheel 25 gearing with wheel 21.

I claim:—

1. A driving mechanism for machines for stretching wire gauze to be used in paper making machines, comprising in combination with the machine frame, a guide face in said machine frame, a bracket movably mounted in said guide face, a stretching roll journaled in said bracket, a toothed wheel rigidly connected with said stretching roll, a threaded shaft designed to shift said bracket in said guide face, a bevel wheel on said threaded shaft, a gear wheel for driving said bevel wheel, a driving shaft arranged between said stretching roll and said threaded shaft, a gear wheel keyed on said driving shaft, a rotatable carrier loosely mounted on said driving shaft, a train of three gear wheels mounted in said carrier the first at the right side, the second at the left side and the third in the upper portion said right and left gear wheels meshing permanently with said gear wheel on the driving shaft, a gear wheel on the axle of said gear wheel for driving said bevel wheel of said threaded shaft, and means for rotating said carrier so that either the stretching roll and the threaded shaft are driven by said right and left gears of the carrier in directions for stretching the wire gauze, or the threaded shaft alone is driven by said third wheel of the carrier in backward direction the stretching roll being at rest, or the stretching roll alone is driven by said third wheel of the carrier in backward direction, or the threaded shaft alone is driven by said first wheel of the carrier in the direction of stretching.

2. In a driving mechanism of the type described the means for driving the threaded shaft from the driving shaft, comprising in combination with the driving shaft and with the threaded shaft, a toothed wheel on said driving shaft, a rotary carrier loosely mounted on said driving shaft, means for rotating said carrier, three spur gears mounted in said carrier one of said spur gears designed to be brought by the rotation of said carrier into the position for operating the drive for said threaded shaft said drive consisting of a bevel wheel on said threaded shaft of an intermediate bevel wheel gearing with said bevel wheel on the threaded shaft and of a gear wheel driving said intermediate bevel wheel if driven from said adjustable spur gear.

In testimony whereof I affix my signature.

RUDOLF ENGLER.